United States Patent [19]

Manservigi et al.

[11] Patent Number: 4,823,536
[45] Date of Patent: Apr. 25, 1989

[54] HANDLING METHOD AND DEVICE

[75] Inventors: Alberto Manservigi; Riccardo Mattei, both of Bologna, Italy

[73] Assignee: G.D Societá Per Azioni, Bologna, Italy

[21] Appl. No.: 134,366

[22] Filed: Dec. 17, 1987

[30] Foreign Application Priority Data

Dec. 17, 1986 [IT] Italy .................................. 3610-A/86

[51] Int. Cl.$^4$ ............................................ B65B 11/30
[52] U.S. Cl. ........................................ 53/466; 53/234; 198/476.1; 198/482.1
[58] Field of Search ............... 53/234, 466; 198/476.1, 198/482.1

[56] References Cited

U.S. PATENT DOCUMENTS

| | | | |
|---|---|---|---|
| 1,887,211 | 11/1932 | Morthimer | 198/476.1 X |
| 2,986,211 | 8/1961 | Hartmann | 198/476.1 X |
| 3,039,587 | 6/1962 | Pallman | 198/476.1 |
| 3,517,477 | 6/1970 | Thornton | 198/470.1 |
| 3,659,694 | 5/1972 | Harris | 198/482.1 |
| 4,511,027 | 4/1985 | Zamboni | 198/476.1 X |
| 4,559,757 | 12/1985 | Focke | 53/234 |

Primary Examiner—John Sipos
Attorney, Agent, or Firm—Marshall, O'Toole, Gerstein, Murray & Bicknell

[57] ABSTRACT

A method and device for handling items, whereby each item is transferred from a first wheel turning in one direction, on to a second wheel turning in the opposite direction, along circular trajectories about the axes of the aforementioned wheels; which transfer is made in a position wherein the two wheels are set a minimum distance apart, and wherein in a seat for an item on the first wheel is aligned and coincides substantially totally with a corresponding seat on the second wheel.

12 Claims, 3 Drawing Sheets

HANDLING METHOD AND DEVICE

BACKGROUND OF THE INVENTION

The present invention relates to a handling method and device.

In particular, the present invention relates to a method of handling other than cylindrical, e.g. parallelepiped-shaped, items.

The present invention is particularly suitable for use on packing machines, for continuously transfering substantially parallelepiped packets from one rotary feeding device to another.

For packing purposes, devices are known enabling items, in particular parallelepiped packets, to be transferred continuously from a first to a second supply wheel. Such known devices, as described for example in U.S. Pat. No. 4,511,027 and British Pat. No. 1,316,933, all feature seats for the said items on both the first and second wheels, and actuating devices designed to provide for substantially radial displacement of the seats on at least one of the said wheels, so that the respective trajectories of each said seat on the first wheel and a corresponding seat on the second wheel are parallel for a given distance extending over a given point of transfer.

Particularly when the said seats are occupied by the said items, such radial displacement of the said seats affects the moment of inertia of the respective wheel, and produces vibration which may be unacceptable in the case of a wheel turning at relatively high speed. Furthermore, each radial displacement of the said seats is usually achieved by means of radial guides and actuators which, in addition to being complex and expensive to produce, also result in serious dynamic off-balancing of the respective wheel.

SUMMARY OF THE INVENTION

The aim of the present invention is to provide a handling method enabling items to be transferred continuously from the seats on one wheel to corresponding seats on a second wheel, but with substantially no-radial displacement of the said seats.

With this aim in view, according to the present invention, there is provided a handling method comprising stages consisting in:

successively mounting and retaining the said items on respective first supporting elements equally spaced about the periphery of a first wheel turning about a first axis; the said first wheel being located adjacent to a second wheel turning about a second axis parallel with the said first axis, and having second equally spaced peripheral supporting elements for the said items; each said supporting element being connected to the respective said wheel in such a manner as to perform, together with the respective said wheel, a first displacement along a circular trajectory about the said axis of the said wheel, and to perform, in relation to the said wheel, a second displacement about a respective further axis parallel with the said first and second axes; the distance between adjacent said further axes being the same on both said first and second wheels;

turning the said two wheels in opposite directions and at the same speed, so as to cause each said supporting element to perform the said first displacement;

causing each said supporting element to perform the said second displacement during part of the said first displacement in which the said supporting element approaches the other said wheel; the said second displacement of each said supporting element being such as to position and maintain it in line with a corresponding supporting element oon the other said wheel over part of the respective said circular trajectory; the distance between the said first and second axes being such that, when located a minimum distance apart, the distance between each said first supporting element on the said first wheel and the corresponding said second supporting element in line with it on the said second wheel is substantially equal to a dimension on nthe respective said item, measured perpendicularly to the respective said further axis; and transferring each said item from the respective said first supporting elementn on to the corresponding said second supporting element, substantially in the said minimum distance position.

The present invention also relates to a device for handling items according to the above method.

According to the present invention, there is provided a handling device comprising two substantially coplanar wheels mounted for rotation about a respective first and second axis parallel with each other; a first and second number of supporting elements for the said items, equally spaced about the periphery of the said first and second wheels respectively; and retaining means for releasably maintaining each said item contatcting a respectie said supporting element; the distance between two adjacent said first supporting elements being equal to the distance between two adjacent said second supporting element; characterised by the fact that first and second pin means parallel with the said first and second axes are presented respectively by the said first and second nwheels along respective first and second circumferences coaxial with the respective said first and second axes, for connecting each said supporting element in rotary manner to the respective said wheel; first actuating means being provided foro turning the said two wheels in opposite directions and at the same speed; and second and third actuating means being provided for positioing and maintaining each said first and each said corresponding second supporting element aligned and facing each other, via rotation of the same about the axes of the respective said pin means, during displacement of the said two corresponding supporting elements into the said minimum distance position, by virtue of rotation of the said wheels; the said first and second axes being arranged in such a manner that the distance between two said corresponding supporting elements in the said minimum distance position substantially equals a dimemsion on the said item.

BRIEF DESCRIPTION OF THE DRAWINGS

Two non-limiting embodiments of the present invention will be described by way of examples with reference to the accompanying drawings, in which.

DETAILED DESCRIPTION OF THE INVENTION

Figure 1:
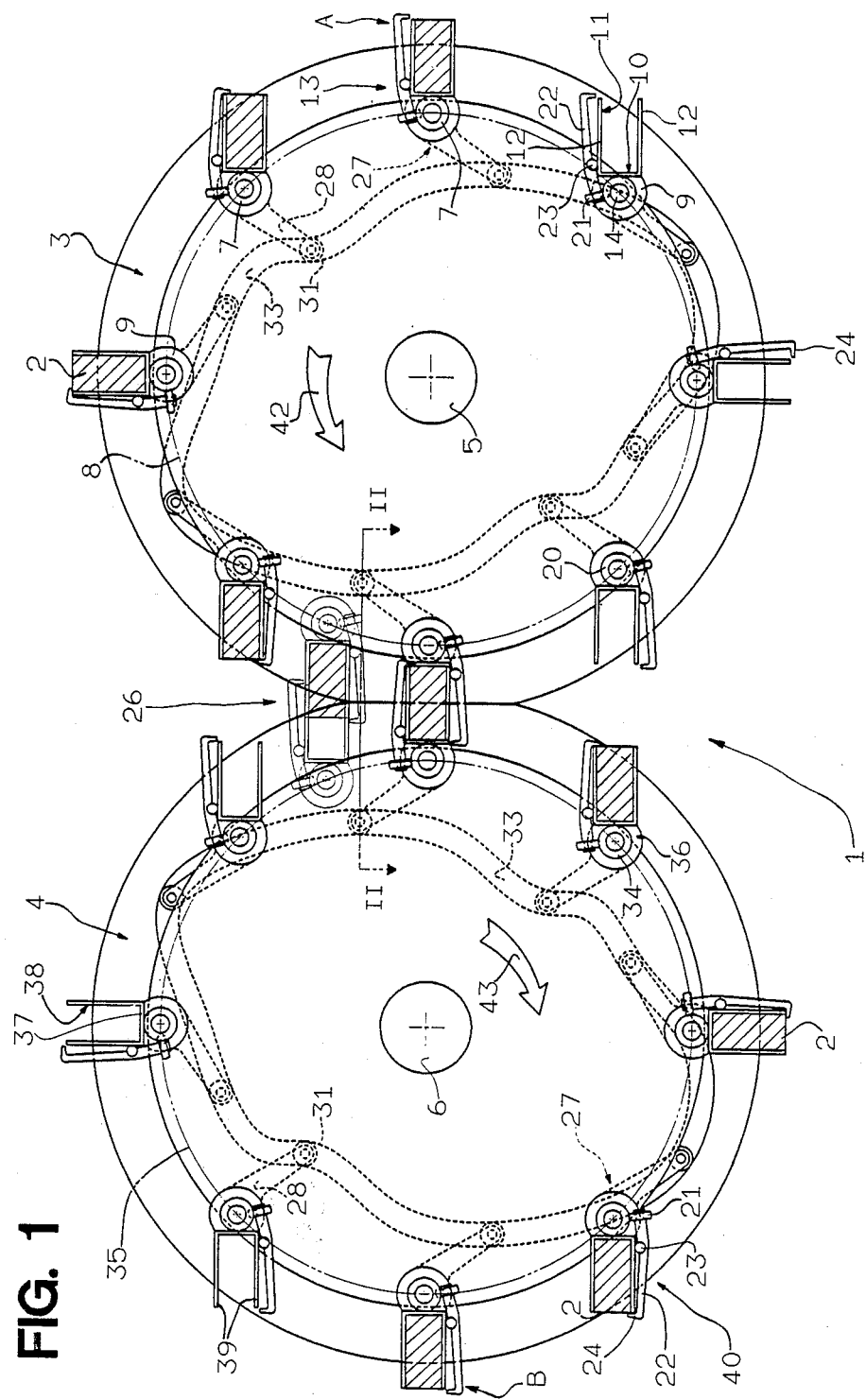
FIG. 1 shows a schematic view of a first embodiment of the device according to the present invention.

Number 1 in FIG. 1 indicates a device for handling substantially parallelepiped items 2 consisting, i thi particular case, of packets.

Device 1 comprises a first and second wheel, 3 and 4, arranged substantially in the same plane and adjacent to each other, and fitted on to respective parallel shafts, 5 and 6, supported in rotary manner on a fixed wall P and constituting the terminal elements of an actuating device designed to turn wheels 3 and 4 about the axes of oshafts 5 and 6 in opposite directions and at the same speed. As shown, particularly in FIG. 2, the said wheel 3, hereinafter also referred to as the "input wheel", is connected in rotary manner with pins 7 parallel with the axis of oshaft 5 and equally spaced about a circumference 8 coaxial with shaft 5 and indicated by the dot-and-dash line in FIG. 1. Each of the said pins 7 is fitted with a supporting element 9 for a respective item 2, which element 9 is fitted laterally with a flat plate 10 parallel with the axis of respective pin 7 and constituting a supporting surface for the said item 2. Each item 2 is housed inside a seat 11 defined by two walls 12 extending perpendicular to plate 10 from the centre portion of two opposite side edges of plate 10 parallel with the axis of respective pin 7.

Each item 2 is retained in releasable manner inside respective seat 11 by a retaining device indicated as a whole by 13 and comprising a rod 14 mounted in axially-sliding manner through an axial hole 15 formed through pin 7. One end of rod 14 projects from the end of pin 7 facing wall P, and is fitted with a tappet 16 which is pushed into contact with the surface 17 of a fixed plate 18 by a spring 19 compressed between the said tappet 16 and the said end of pin 7.

The other end of rod 14 projects from pin 7 and is fitted with a truncated-cone cam 20 coaxial with rod 14 and designed to move, together with rod 14, into contact with a tapper roller 21 connected to one end of a rocker arm 22 which, as shown more clearly in FIG. 1, pivots centrally on a pivot 23 parallel with pin 7 and supported on one of walls 12. On the end opposite the one fitted with roller 21, rocker arm 22 is connected integral with a tooth 24 extending perpendicular to the said wall 12 and beyond the free edge of the same, for locking items 2 inside seat 11.

Figure 2:
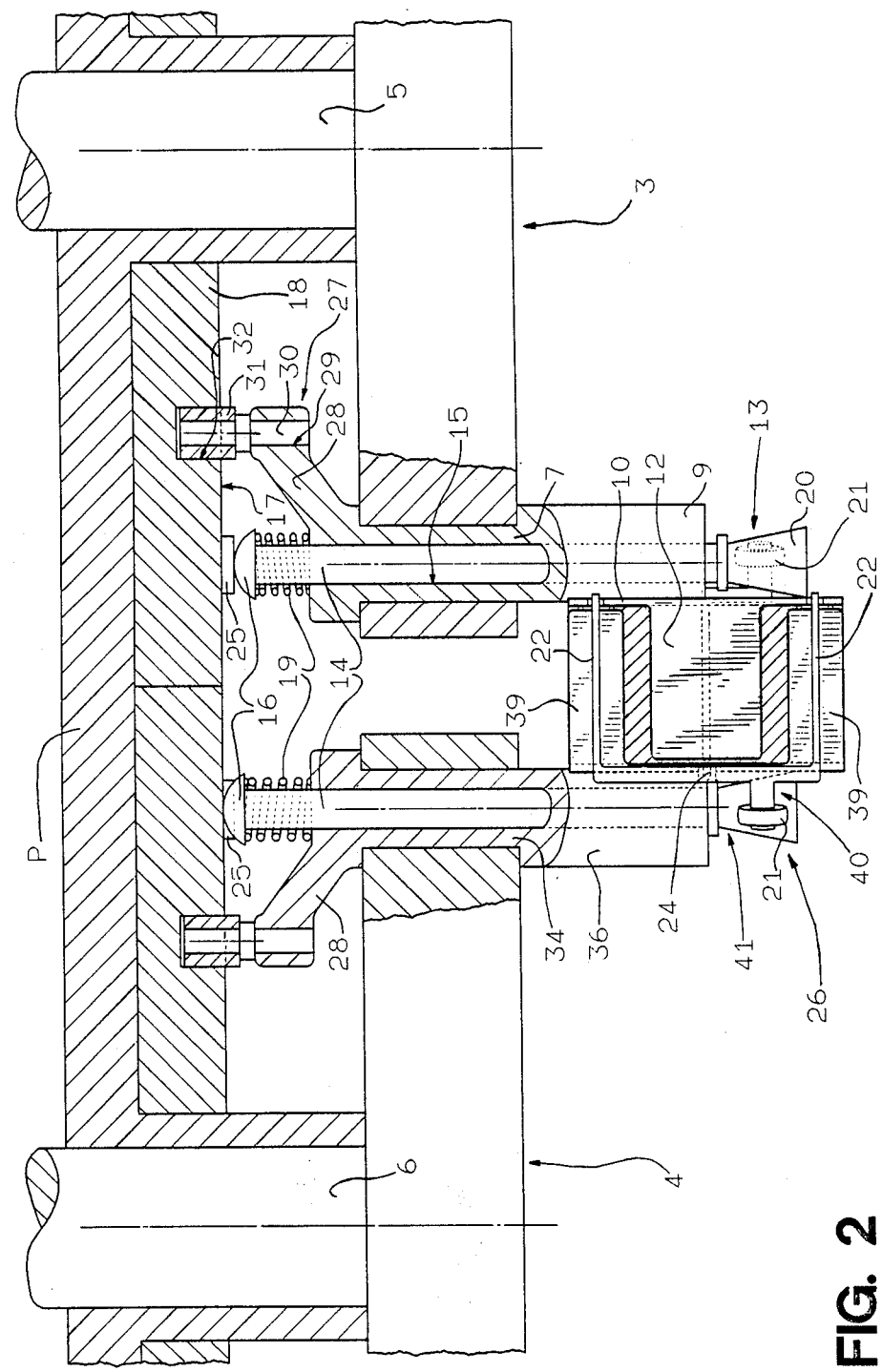
FIG. 2 shows a section along line II—II in FIG. 1.

As shown in FIG. 2, a flat cam 25 on surface 17 of plate 18 is engaged by tappet 16 on rod 14 in such a manner as to axially displace cam 20 against the action of spring 19, and turn tooth 24 outwards so as to open the outer end of seat 11. In the example l shown, cam 25 is designed to keep each tooth 24 closed between a position immediately following a loading station A, and a position immediately preceding a station 26 wherein items 2 are transferred from wheel 3 on to wheel 4 and which is hereinafter also refered to as the minimum distance position of wheels 3 and 4.

Each pin 7 is connected to an actuating device 27 comprising a lateral appendix 28 extending substantially radially outwards from the end of pin 7 facing plate P. Close to its free end, appendix 28 presents a through hole 29 parallel with hole 15 and engaged by a pin 30, the free end of which is fitted in rotary manner with a tappet roller 31 engaged inside an annular groove 32 formed on surface 17 of plate 18, and defining a face cam 33. As shown, particularly in FIG. 2, the said wheel 4, hereinafter also referred to as the "output wheel", is fitted in rotary manner with pins 34 parallel with the axis of shaft 6 and eaually spaced about a circumference 35 coaxial with shaft 6 and indicated by the dot-and-dash line in FIG. 1, so that the distance between adjacent pins 34 equals that between adjacent pins 7.

Each pin 34 is fitted with a supporting element 36 for a respective item 2, which element 36 is fitted laterally with a flat plate 37 parallel with the axis of respective pin 34 and constituting a supporting surface for the said item 2. Each itme 2 may be housed inside a seat 38 defined by two walls extending perpendicular toplate 37 from two opposite side edges of plate 37 parallel with the axis of respective pin 34. Each of the said walls comprises two plates 39 extending outwards from the opposite ends of the respective edge of plate 37 and defining a cavity for receiving a wall 12.

Each seat 38 presents a retaining device 40 and an actuating device 41, respectively identical to retaining device 13 and actuating device 27, and the component parts of which are indicated using the same numbering system as on wheel 3. The only difference between retaining device 40 and 13 is that, on device 40, cam 25 is designed to keep teeth 24closed between a position immediately downstream from station 26, and a position immediately upstream from a station B wherein items 2 leae device 1. As shown in FIGS. 1 and 2, the distance between the axes of shafts 5 and 6 is such that, when a seat 11 and a corresponding seat 38 move into the minimum distance position in station 26, the said seats 11 and 38 mate so as to form a volume of substantially the same shape and size as item 2.

In actual use, an item 2 is fed inside a seat 11, by any known type of feeding means (not shown), as seat 11 travels through station A with its retaining device 13 open. Once inside the said seat 11, the said item 2 is rtained inside the same by tooth 24 closing, and is fed forward by wheel 3towards wheel 4 in the traveling direction shown by arrow 42 in FIG. 1. Cam 33 relative to wheel 3 is designed in such a manner that, as seat 11 approaches wheel 4, the respective supporting element 9 turns about the axis of respective pin 7, so as to position seat 11 radially outwarded in stations A and 26, and move seat 11 parallel with itself for at least a portion of the respective trajectories through station A and station 26.

At the same time, a seat 38 on wheel 4, correponding with the said seat 11, is fed forward, in the direction shown by arrow 43 in FIG. 1, from station B towards wheel 3 and station 26, with its tooth 24 open. As on wheel 3, cam 33 relative to wheel 4 is designed in such a manner that, as seat 38 approaches wheel 3, respective supporting element 36 turns about the axis of respective pin 7 so as to position seat 38 radially outwards in stations B and 26, and move seat 38 parallel with itself for at least a portion of the respective trajectories through station B and station 26.

Subsequent to rotation of the said seat 11 and corresponding seat 38 astride station 26, the said seats 11 and 38 are arranged in line with each other over a portion of the trajectory through station 26. By virtue of the said distance between the axes of shafts 5 and 6, the said corresponding seats 11 and 38 traveling over the said trajectory portion gradually mate until they substantially fit one inside the other in station 26. It should be pointed out that such mating is achieved by virtue of the design of seats 11 and 38, the respective walls 12 and plates 39 of which are designed to engage one inside the other, and by virtue of the fact that seats 11 and 38 are aligned with each other prior to interference commencing.

Such interference-free mating may, of course, also be achieved by replacing plates 39 with two walls (not shown) similar to walls 12, but extending perpepnpdicular to plate 37 from the two opposite side edges of the same perpendicular to the axis of respective pin 34. As soon as mating commences, retaining device 13 opens tooth 24, whereas retaining device 40 only closes tooth 24 upon both seats 11 and 38 being fully mated in station 26, thus causing item 2 to be transferred from seat 11 to seat 38, and fed forward to station B by wheel 4.

From the foregoing description, device 1 therefore provides for continuously transerring items 2 from owheel 3 to wheel 4, with substantially no radial displacement of seats 11 and 38 in relation to the said wheels 3 and 4. In like manner, it is possible to operate at relatively high speeds, with no vibration which might impair the stability of shafts 5 and 6, and no stress being exerted on items 2 during transfer.

Figure 3:
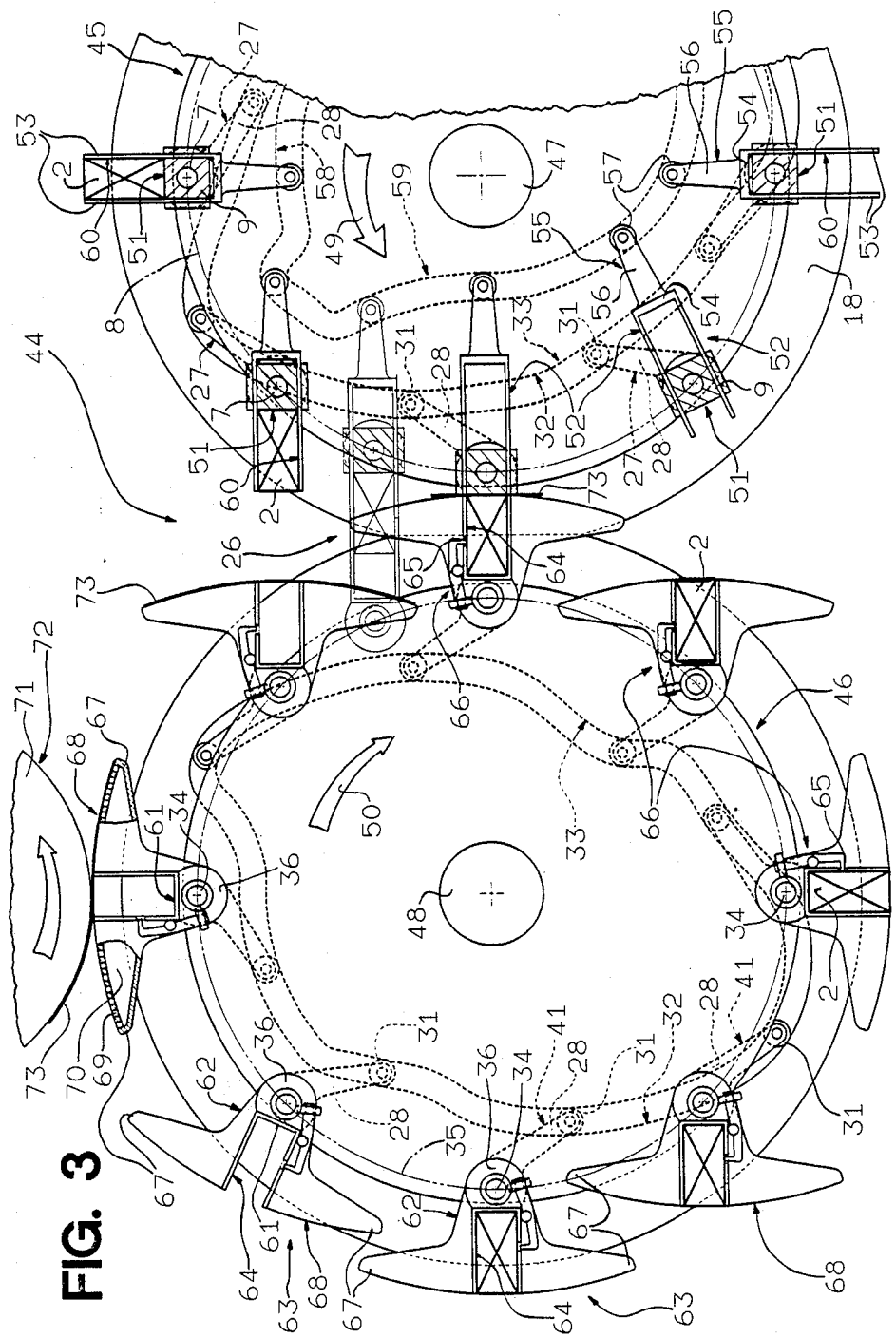
FIG. 3 shows a schematic view of a further embodimentn of the device according to the present invention.

The embodiment shown in FIG. 3 relates to a handling device indicated as a whole by 44 and which, like device 1, comprises an input wheel 45 and an output wheel 46 substantially located in the same plane and fitted on to respective shafts 47 and 48 designed to turn in opposite directions so as to turn respective sheels 45 and 46 in the direction shown by respective arrows 49 and 50.

Wheel 45 presents a number of elements in common with wheel 3, and which are indicated using the same numbering system.

In particular, wheel 45 presents a number of pins 7 equally spaced about a circumference 8, and each supporting, in rotary manner, a supporting element 9 for an item 2.

Each supporting element 9 is designed to turn about respective pin 7 by virtue of an actuating device 27 comprising ann appendix 28 extending outwards from supporting element 9 and supporting, in rotary manner on its free end, a tappet roller 31 engaged inside a front groove 32 formed on a fixed plate 18, and defining a face cam 33. Like devices 27 on wheel 3, each actuating device on wheel 45 also moves respective supporting element 9 about the axis of respective pin 7, so that the ouer surface 51 of supporting element 9, which constitutes a supporting surface for respective item 2, is arranged facing outwards in transfer station 26, and moves parallel with itself over a given portion of the said station 26.

As shown in FIG. 3, each supporting element 9 constitutes a prismatic guide for a respective slide 52 designed to travel perpepndicular to respective surface 51, and comprising two flelxible blades 53 located on opposite sides of respective supporting element 9 and extending outwards in relation to shaft 47; and a plate 54 located between the said supporting element 9 and extending outwards in relation to shaft 47; and a plate 54 located between the said supporting element 9 and shaft 47, and connecting the inner ends of the said two blades 53. Each plate 54 presents a respective actuating device 55 designed to move plate 54 to and from the inner end of respectie supporting element 9, between a first position, wherein plate 54 contacts the said supporting element 9, and a second position, wherein plate 54 is moved towards shaft 47 so as to position the free end of respective blades 53 in line with respective surface 51.

Each actuating device 55 comprises an appendix 56 extending radially inwards of wheel 45 from respective plate 54, and supporting, in rotary manner on its free end, a tappet roller 57 engaging an annular groove 58 formed on plate 18, and defining a face cam 59. Cam 59 is designed so that, when a supporting element 9 starts moving parallel with itself in the direction of transfer station 26, respective plate 54 starts moving from the said first to the said second position, which is reached as supporting element 9 moves through transfer station 26.

Each pair of blades 53 defines, togethr with respective surface 51, a seat 60 for a respective item 2. Inn particular, each seat 60 presents a volume varying between that of respective item 2, when respective surface 51 is in the said first position, and substantially zero, when sufface 51 is in the said second position. Each seat 60 presents a device for retaining respecive item 2 when blades 53 are in the extracted position corresponding with the said first position. In the example shown, the said retaining device consists of blades 53 themselves, which flexibly compres the said item 2.

Wheel 46 presents a number of elements in common with wheel 4, and which are indicated using the same numbering system.

In particular, wheel 46 presents a number of pins 34 equally spaced about a circumference 35, and each supporting, in rotary manner, a supporting element 36 for an item 2.

Each supporting element 36 is designed to turn about respective pin 34 by virtue of an actuating device 41 similar to actuating device 27 and comprising an appendix 28 extending outwards from supporting element 36 and supporting, in rotary manner on its free end, a tappet roller 31 engaged inside a front groove 32 formed on a fixed plate 18, and defining a face cam 33.

Like devices 27 on wheel 45, each actuating device 41 on wheel 46 also moves respective supporting element 36 about the axis of respective pin 34, so that the ouer surface 61 of supporting element 36, which constitutes a supporting surface for respective item 2, is arranged facing outwards of wheel 46 in transfer station 26, and moves parallel with itself over a given portion of the said station 26.

Each supporting element 36 constitutes the end portion of a core 62 of a respective substantially T-shaped body 63 integral with supporting element 36. Core 62 of each body 63 presents a seat 64 defined at the end of surface 61 and constituting a seat for a respective item 2. Through a side wall of each seat 64, there is formed a through hole engaged by an end tooth 65 of a retaining device 66 similar to device 40 and designed to retain each item 2 inside respective seat 64.

Each body 63 presents, on its free end, two wings 67 extending from opposite sides of respective core 62 and defining a head 68 defined externally by a circulr punched wall 69 constituting a suction element and externaly closing a cavity 70 formed inside head 68 and commnicating with a knownn suction device (not oshown).

Cam 33 of wheel 46 is shaped in such a manner that, during part of the dislacement of respective supporting element 36 in the direction of wheel 45, each wall 69 comes into contact with a rotary output roller 71 of a known device 72 for feeding sheets 73 of wrapping material which, once sucked off successively by head 68, are held by suction on to respective walls 69 as far as transfer station 26. Operation of device 44 is as described in connection with device 1. The only functional difference between devices 44 and 1 is that, when, on device 44, a supporting element 9 and corresponding supporting element 36 approach transfer station 26, in line with each other and moving parallel with themselves, and the free ends of blades 53 connected to the said supporting element 9 come into substantial contact with head 68 of corresponding supporting element 36, the volume of the respective seat 60 diminishes by virtue of the gradual displacement of respective slide 52 in the direction of shaft 47, thus enabling gradual insertion of respective item 2 inside seat 63 facing it.

As the said seat 64 is closed externally by a respective sheet 73, gradual insertion of item 2 inside seat 64 causes sheet 73 to be inserted simultaneously inside seat 64, and folded in U-shaped manner about item 2. Once fully inserted inside respective seat 64, the said item 2 is retained inside the same by retaining device 40, and moved out of station 26 by sheel 46. Known folding means (not shown) then provide for completing wrapping of item 2 inside sheet 73.

In other words, device 44 provides, not only for continuously transferring parallelepiped items 2 from wheel 45 on to wheel 46, but also for simultaneously wrapping the same.

Sheets 73 may, of course, be fed into transfer station 26 by known supply devices, other than those described herein.

We claim:

1. A handling method comprising:
   successively mounting and retaining the items (2) on respective first supporting elements (9) equally spaced about the periphery of a first wheel (3 or 45) turning at substantially constant speed about a first axis; the [said] first wheel (3 or 45) being located adjacent to a second wheel (4 or 46) turning about a second axis parallel with the [said] first axis, and having second equally spaced peripheral supporting elements (36) for the [said] items (2); each [said] supporting element (9, 36) being connected to the respective [said] wheel (3, 4 or 45, 46) in such a manner as to perform, together with the respective [said] wheel (3, 4 or 45, 46), a first displacement along a circular trajectory about the [said] axis of the [said] wheel (3, 4 or 45, 46), and to perform, in relation to the [said] wheel (3, 4 or 45, 46), a second displacement about a respective further axis parallel with the [said] first and second axes; the distance between adjacent [said] further axes being constant, and being the same on both [said] first and second wheels (3, 4, 45, 46);

[—] turning the [said] two wheels (3, 4, or 45, 46) in opposite directions and at the same speed, so as to cause each [said] supporting element (9, 36) to perform the [said] first displacement;

[—] causing each [said] supporting element (9, 36) to perform the [said] second displacement during part of the [said] first displacement in which the [said] supporting element (9, 36) approaches the other [said] wheel (3, 4 or 45, 46); the [said] second displacement of each [said] supporting element (9, 36) being such as to position and maintain it in line with a corresponding supporting element (9, 36) on the other said wheel (3, 4 or 45, 46) over part of the respective [said] circular trajectory; the distance between the [said] first and second axes being such that, when located a minimum distatnce (26) apart, the distance between each first supporting element (9) on the first wheel (3 or 45) and the corresponding second supporting element (36) in line with it on the second wheel (4 or 46) is substantially equal to a dimension on the respective item (2) measured perpendicularly to the respective further axis; and
   transferring each item (2) from the respective first supporting element (9) on to the corresponding second supporting element (36), substantially in the minimm distance position (26).

2. A method as claimed in claim 1, characterised by the fact that each said supporting element (9, 36) defines an end wall of a respective seat (11 or 60; 38 or 64) for a respective said item (2), which is rigidly connected to the said end wall and open at the end opposite the said end wall; each said seat (11 or 60; 38 or 64) being turned, during the said second displacement, so as to be aligned with a corresponding seat (11 or 60; 38 or 64) on the other said wheel (3, 4 or 45, 46), and being formed in such a manner as to mate with the said corresponding seat (11 or 60; 38 or 64) so as to substantially coincide with the same in the said minimum distance position (26).

3. A method as claimed in claim 1, characterised by the fact that each said supporting element (9, 36) defines an end wall of a respective seat (60, 64) for a respective said item (2); each said seat (64) on the said second wheel (46) being of fixed volume; each said seat (60) on the said first wheel (45) being a variable-volume seat which is turned, during the said second displacement, so as to be aligned with a corresponding seat (64) on the said second wheel (46); and the volume of each said seat (60) on the said first wheel (45) being gradually reduced to substantially zero in the said minimum distance position (26).

4. A method as claimed in claim 2, characterised by the fact that each said item (2) is transferred from a respective said seat (11 or 60) on the said first wheel (3 or 45) into a corresponding said seat (38 or 64) on the said second wheel (4 or 46) by retaining the said item (2) inside the said seat (38 or 64) on the said second wheel (4 or 46) in the said minimum distance position (26).

5. A handling device for items (2) comprising two substantially coplanar wheels (3, 4 or 45, 46) mounted for rotation at substantially constant speed about a respective first and second axis parallel with each othr; a first and second number of supporting elements (9, 36) for the items (2), equally spaced about the periphery of the said first (3 or 45) and second (4 or 46) wheels respectively; and retaining means (13, 40; 53, 66) fo releasably maintaining each item (2) contacting a respective supporting element (9,36); the distance between two adjacent first supporting elements (9) being constant, and being equal to the distance between two adjacent second supporting elements (36); characterized by the fact that first and second pin means (7; 34) parallel with the first and second axes are presented respectively by the first (3 or 45) and second (4 or 46) wheels along respective first and second circumferences (8; 35) coaxial with the respective first and second axes, for connecting each supporting element (9, 36) in rotary manner to the respective said wheel (3, 4 or 45, 46); first actuating means (5, 6 or 47, 48) being provided for turning the two wheels (3, 4 or 45, 46) in opposite diretions and at the same speed; and second and tird atuating means (27; 41) being provided for positioning and maintaining each first (9) and each corresponding second (36) supporting element aligned and facing each other, via rotation of the same about the axes of othe respective pin means (7; 34), during displacement of the two correponding supporting elements (9, 36) into the minimum distance position (26), by virtue of rotation of the wheels (3, 4 or 45, 46); the first and second axes being arranged in such a manner that the distance between two corresponding supporting elements (9, 36) in the minimum distance position (26) substantially equals a dimension on the item (2).

6. A device as claimed in claim 5, characterised by the fact that a seat (11, 38) for a respective said item (2) is connected integral with each said supporting element (9, 36); the bottom end of each said seat (11, 38) being defined by the respective supporting element (9, 36), and the other end of each said seat (11, 38) being open; each said seat (11, 38) being defined laterally by walls (12, 39), and the walls (12, 39) of each seat (11, 38) on the said wheels (3, 4) being designed in such a manner that the seats (11, 39) on the said two wheels (3, 4) may mate with no interference between the corresponding walls (12, 39).

7. A device as claimed in claim 5, characterised by the fact that a seat (60, 64) for a respective said item (2) is connected to each said supporting element (9, 36); the bottom end of each said seat (60, 64) being defined by the respective supporting element (9, 36), and the other end of each said seat (60, 64) being open; each said seat (64) on the said second wheel (46) being of fixed volume and integral with the respective said supporting element (36); each said seat (60) on the said first wheel (45) being of variable volume, and fourth actuating means (55) being provided for varying the volume of each said variable-volume seat (60) between a volume substantially equal to that of each said fixed-volume seat (64) and zero.

8. A device as claimed in claim 7 characterised by the fact that each said variable-volume seat (60) is defined by two wall elements (53) located on opposite sides of the respective said supporting element (9) and designed to slide on the same by virtue of the said fourth actuating means (55).

9. A device as claimed in claim 8, characterised by the fact that retaining means (13; 53, 66) are provided on each said seat (11, 38; 60, 64) for releasably locking a respective said item (2) inside the said seat (11, 38; 60, 64).

10. A handling device for items comprising two substantially coplanar wheels (3, 4 or 45, 46) mounted for rotation about a respective first and second axis parallel with each other; a first and second number of supporting elements (9, 36) for the items (2), equally spaced about the periphery of the first (3 or 45) and sescond (4 or 46) wheels respectively; and retaining means (13, 40; 53, 66) for releasably maintaining each item (2) contacting a respective supporting element (9, 36); the distance between two adjacent first supporting elements (9) being equal to the distance between two adjacent second supporting elements (36); characterized by the fact that first and second pin means (7; 34) parallel with the first and second axes are presented respectively by the first (3 or 45) and second (4 or 46) wheels along respective first and second cicumferences (8; 35) coaxial with the respective first and second axes, for connecting each supporting element (9, 36) in rotary manner to the respective wheel (3, 4 or 45, 46); first actuating means (5, 6 or 47, 48) being provided for turning the two wheels (3, 4 or 45, 46) in opposite directions and at the same speed; and second and third actuating means (27; 41) being provided for positioning and maintaining each first (9) and each corresponding second (36) supporting element aligned and facing each other, via rotation of the same about the axes of the respective pin meansn (7; 34), during displacement of the two corresponding supporting elements (9, 36) into the minimum distance position (26), by virtue of rotation of the wheels (3, 4 or 45, 46); the first and second axes being arranged in such a manner that the distance between two corresponding supporting elements (9, 36) in the minimum distatnce position (26) substantially equals a dimension on the item (2);

a seat (11, 38) for a respective item (2) is connected integral with each supporting element (9, 36); the bottom end of each seat (11, 38) being defined by the respective supporting element (9, 36), and the other end of each seat (11, 38) being open; each seat (11, 38) being defined laterally by walls (12, 39), and the walls (12, 39) of each seat (11, 38) on the wheels (3, 4) being designed in such a manner as to mate inside the corresponding walls (12, 39) of th corresponding seat (11, 38) on the other wheel (3 or 4) so that the eats (11, 38) on the two wheels (3, 4) may mate with no interference betwteen the corresponding walls (12, 39).

11. A handling method for items comprising:
successively mounting and retaining the items (2) on respective first supporting elements (9) equally spaced about the periphery of a first wheel (3 or 45) turning about a first axis; the first wheel (3 or 45) being located adjacent to a second wheel (4 or 46) turning about a second axis parallel with the first axis, and having second equally spaced peripheral supporting elements (36) for the items (2); each supporting element (9,36) being connected to the respective whell (3, 4 or 45, 46) in such a manner as to perform, together with the respective wheel (3, 4 or 45, 46), a first displacement along a circular trajectory about the axis of the wheel (3, 4 or 45, 46), and to peform, in relation to the wheel (3, 4 or 45, 46), a second displacement about a respective further axis parallel with the first and second axes; the distance between adjacent further axes being the same on both first and second wheels (3, 4, 45, 46);

each supporting element (9, 36) defining an end wall of a respective seat (60, 64) for a respective item (2); each said seat (64) on the said second wheel (46) being of fixed volume; each seat (60) on the first wheel (45) being a variable-volume seat which is turned, during the said second displacement, so as ot be aligned with a corresponding seat (64) on the said second wheel (46); and the volume of each seat (60) on the first wheel (45) being gradually reduced to substantially zero in the said minimum distance position (26);

turning the two wheels (3, 4, or 45, 46) in opposite directions and at the same speed, so as to cause each supporting element (9, 36) to perform the first displacement;

causing each supporting element (9, 36) to perform the second displacement during part of the first displacement in which the supporting element (9, 36) approaches the other wheel (3, 4 or 45, 46); the second displacement of each supporting element (9, 36) being such as to position and maintain it in line with a corresponding supporting element (9, 36) on the other said wheel (3,4 or 45, 46) over part of the respective circular trajectory; the distance between the first and second axes being such that, when located a minimum distance (26) apart, the distance between each first supporting element (9) on the first wheel (3 or 45) and the corresponding said second supporting element (36) in line with it on the second wheel (4 or 46) is substantially equal to a dimension on the respective item (2) measured perpepndicularly to the respective further axis;

transferring each item (2) from the respective first supporting element (9) on to the corresponding second supporting element (36), substantially in the minimum distance position (26); and feeding a sheet (73) of wrapping material for each item (2) between each pair of corresponding supporting elements (9, 36) during displacement of the same into the minimum distance position (26).

12. A handling device for items comprising wto substantially coplanar wheels (3, 4 or 45, 46) mounted for rotation about a respective first and second axis parallel with each other; a first and second number of supporting elements (9, 36) for the items (2), equally spaced about the periphery of the first (3 or 45) and second (4 or 46) wheels respectively; and retaining means (13, 40; 53, 66) for relasably maintaining each item (2) contactinga respectie supporting element (9, 36); the distance between two adjacent first supporting elements (9) being equal to the distance between two adjacent second supporting elements (36); characterized by the fact that first and second pin means (7; 34) parallel with the first and second axes are presented respectively by the first (3 or 45) and second (4 or 46) wheels along respective first and second circumferences (8; 35) coaxial with the respective first and second axes, for connecting each supporting element (9, 36) in rotary manner to the respective wheel (3, 4 or 45, 46); first actuating means (5, 6 or 47, 48) being provided foro turning the two wheels (3, 4 or 45, 46) in opposite directions and at the same speed; and second and third actuating means (27; 41) being provided for positioning and maintaining each first (9) and each corresponding second (36) supporting element aligned and facing each other, via rotation of the same about the axes of the respective pin means (7; 34), during displacementn of the two corresponding supporting elements (9, 36) into the minimum distance position (26), by virtue of rotation of the wheels (3,4 or 45, 46); the first and second axes being arranged in such a manner that the distance between two corresponding supporting elements (9, 36) in the minimum distance position (26) substantially equals a dimension on the item (2);

a seat (60, 64) for a respective item (2) is connected to each supporting element (9, 36); the bottom end of each seat (60, 64) being defined by the respective supporting element (9, 36), and the other end of each seat (60, 64) being open; each seat (64) on the second wheel (46) being of fixed volume and integral with the respective supporting element (36); each seat (60) on the first wheel (45) being of variable volume, and fourth actuating means (55) being provided for varying the volume of each variable volume seat (60) between a volume substantially equal to that of each fixed volume seat (64) and zero; and suction means (69) positioned laterally on the open end of each seat (64) on the second wheel (46); and feeding means (72) being provided for successively feeding sheets (73) of wrapping material to the suction means (69) of each seat (64) on the second wheel (46).

* * * * *